(No Model.)

A. PUGSLEY.
TOY.

No. 450,495. Patented Apr. 14, 1891.

WITNESSES:
C. Sedgwick
E. M. Clark

INVENTOR:
A. Pugsley
BY
Munn & Co
ATTORNEYS

UNITED STATES PATENT OFFICE.

ABRAHAM PUGSLEY, OF JAMESTOWN, RHODE ISLAND.

TOY.

SPECIFICATION forming part of Letters Patent No. 450,495, dated April 14, 1891.

Application filed January 3, 1891. Serial No. 376,596. (No model.)

*To all whom it may concern:*

Be it known that I, ABRAHAM PUGSLEY, of Jamestown, in the county of Newport and State of Rhode Island, have invented a new and Improved Toy, of which the following is a full, clear, and exact description.

My invention is an improvement in toys; and the object of my invention is to produce a toy for the amusement of children which will closely resemble a bird and which may be made to appear to fly.

To this end my invention consists in a peculiarly-constructed bird, which is suspended by an elastic cord, and the construction of which will be hereinafter fully described, and specifically pointed out in the claims.

Reference is to be had to the accompanying drawings, forming a part of this specification, in which similar letters of reference indicate corresponding parts in both figures.

Figure 1:
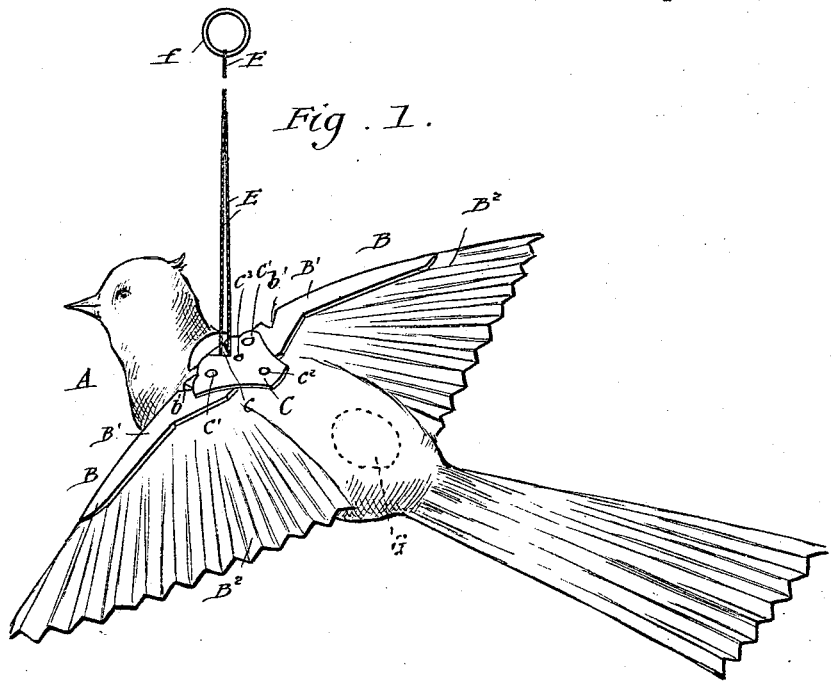
Figure 2:
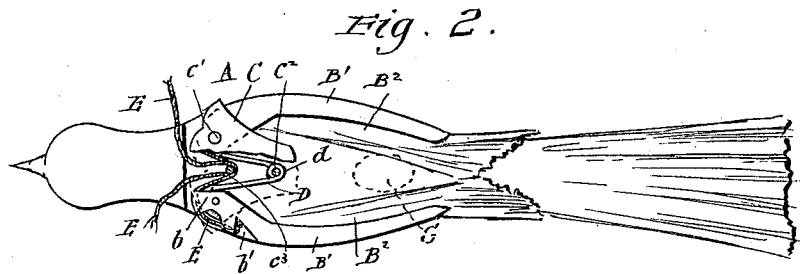

Figure 1 is a perspective view of the bird with its wings spread; and Fig. 2 is a broken top view with the wings closed, the wing-plate being broken away to show the manner in which the wings are held closed by the spring.

The bird A may be made to imitate any variety of bird, although it is preferably made small, and it may be ornamented to suit the fancy. The bird is provided with wings B, which are located in relation to the body like the ordinary wings of a bird, and which are adapted to be opened and closed in the manner described below. Each wing consists of a front plate or strip B′, which gives shape to the wing and holds it in position, and a flexible connection $B^2$, which is secured at one edge to the strip B′ and at the opposite edge to the body of the bird. The flexible portion $B^2$ is usually made of cloth, and is crimped or crinkled so that it will somewhat resemble feathers, and the strip B′ is curved inwardly toward its inner end, which is cut off diagonally, as shown at $b$, so that the pressure of a spring upon the diagonal portion will hold the wing closed, and near the inner end of the strip is a notch $b′$, the notch having a square shoulder near the inner end of the strip. The strips B′ are pivoted near their inner ends, and extending from the notches $b′$ of the strips to the inner end are grooves, which are made in the front edge of the strips, and in which the suspending-cord is held, as described below.

The inner ends of the wings are covered by a plate C, which serves as a cover for the wings, and which also forms a support to steady the wings, the spring which presses against the wings, and the pin around which the suspending-cord is passed. The plate C has a notch $c$ in its front edge, through which the suspending-cord passes, a pin $c′$, extending downward through it and into the body of the bird near each side of the plate, and on which the wing-strips B′ are pivoted, a pin $c^2$, which extends downward through the rear end of the plate and into the body of the bird, and which serves as a pivot for the spring D, which presses against the wing-strips, and a pin $c^3$, which extends downward through the center of the plate and into the body of the bird, and which serves as a guide for the suspending-cord. The spring D has a central coil $d$, which is mounted on the pin $c^2$, and the ends of the spring extend forward and press against the inner ends of the wing-strips B′. It will thus be seen that when the wings are closed the spring, pressing against the diagonal ends of the wings, will hold them in a closed position, and when the wings are opened the springs will press against the front point of the wing-strips, so as not to press the wings against the body of the bird.

The suspending-cord E is doubled in the center, and is secured to an elastic cord F, which terminates in a finger-loop $f$, adapted to receive a finger of the hand, and each member of the loop is passed through the notch $c$ of the plate C and around the pin $c^3$ in opposite directions, the members being finally placed in the grooves near the ends of the wing-strips B′, and the ends of the cord are knotted and secured in the notches $b′$ of the wing-strips, as shown in Fig. 2. It will thus be seen that if the wings are closed they may be opened by pulling upon the cord E, as the members of the cord, passing in opposite directions around the pin $c^3$ and around the front end of the wing-strips, will pull the wings forward and the inner ends of the strips rearward, so that the wings will be made to extend their full length.

The bird is properly balanced by boring a hole in the body and filling the hole with lead or some heavy substance, as indicated by dotted lines at G, and this ballast may be placed in any desired portion of the body, so as to properly adjust the same in relation to the suspending-cord.

The wings of the bird are opened by pulling on the suspending-cord in the manner described, and the finger-loop $f$ is then placed over the finger, and by raising and lowering the hand and giving it other movements the bird may be moved upward and downward and made to sail through the air in almost an exact imitation of the flight of a real bird.

Having thus described my invention, I claim as new and desire to secure by Letters Patent—

1. The combination, with the body of the bird, of wing-strips pivoted thereto, a flexible connection between the wing-strips and the body, and a spring held upon the body with its ends pressing against the inner ends of the wing-strips, substantially as described.

2. The combination, with the body of the bird, of wing-strips pivoted thereon, a flexible connection between the wing-strips and the body, a spring held to the body so as to press outward on the wing-strips, and a suspending-cord having its ends secured to the inner ends of the wing-strips and having its outer portion secured to an elastic cord, substantially as described.

3. The combination, with the body of the bird and wing-strips pivoted on the body and connected thereto by flexible material, of a plate arranged above the inner ends of the wing-strips, pins extending through the plate and forming the pivots of the wing-strips, a spring held between the plate and body with its ends pressing against the inner ends of the wing-strips, a central pin extending from the plate into the body, and a suspending-cord passing around the central pin and having its ends secured to the inner portions of the wing-strips, substantially as described.

4. The combination, with the body of the bird and wing-strips pivoted thereon and having flexible material extending from them to the body of the bird, the wing-strips having also notches near their inner ends, of a pin arranged between the inner ends of the wing-strips and a suspending-cord passing in opposite directions around the pin and having its ends secured to the notches of the wing-strips, substantially as described.

5. The combination, with the body of the bird and wing-strips pivoted thereon and provided with a flexible connection between them and the body, the wing-strips having also notches near their inner ends and having grooves extending from the notches to their inner ends, of a pin arranged between the inner ends of the wing-strips and a suspending-cord extending in opposite directions around the pin through the grooves and having its ends secured in the notches, substantially as described.

6. The combination, with the bird-body, of wing-strips having their inner ends pivoted to the body and cut diagonally, as shown, flexible material extending from the wing-strips to the body, and a spring having its central coil secured to the body and having its ends pressing against the inner ends of the wing-strips, substantially as described.

ABRAHAM PUGSLEY.

Witnesses:
EDWARD F. HUGHES,
JOHN F. SMITH.